(12) United States Patent
Coppock

(10) Patent No.: US 6,517,049 B2
(45) Date of Patent: Feb. 11, 2003

(54) METHOD AND VALVE FOR CONTROLLING FLUID FLOW, AND METHOD OF SERVICING VALVE

(75) Inventor: Andrew Lee Coppock, Los Angeles, CA (US)

(73) Assignee: Los Angeles Pump and Valve Products, Huntington Park, CA (US)

( * ) Notice: Subject to any disclaimer, the term of this patent is extended or adjusted under 35 U.S.C. 154(b) by 0 days.

(21) Appl. No.: 09/902,737

(22) Filed: Jul. 12, 2001

(65) Prior Publication Data

US 2003/0010953 A1 Jan. 16, 2003

(51) Int. Cl.$^7$ ................................................ F16K 3/00
(52) U.S. Cl. ...................................... 251/329; 251/360
(58) Field of Search ............................... 251/357, 360, 251/361, 362, 363, 326, 329, 366, 328; 137/15.23, 315.29, 315.31

(56) References Cited

U.S. PATENT DOCUMENTS

| | | | | |
|---|---|---|---|---|
| 2,229,871 A | * | 1/1941 | Penick et al. | ............... 251/200 |
| 2,797,062 A | * | 6/1957 | Otter | ............................. 251/168 |
| 4,651,973 A | * | 3/1987 | Oliver | ........................... 251/267 |
| 5,370,363 A | * | 12/1994 | Klimpke | ....................... 251/329 |
| 5,878,994 A | * | 3/1999 | Crain | ........................... 251/329 |

* cited by examiner

Primary Examiner—Henry C. Yuen
Assistant Examiner—Patrick Buechner
(74) Attorney, Agent, or Firm—David R Yohannan; Collier Shannon Scott

(57) ABSTRACT

A gate valve for controlling fluid flow through a housing is disclosed. The gate valve includes a frusto-conical shaped internal cavity having a fluid inlet and a fluid outlet formed in the wall thereof. Fluid flow through the cavity (from inlet to outlet) is transverse to the direction of the taper of the frusto-conical cavity. A gate including a frusto-conical portion is disposed within the housing. The frusto-conical portion of the gate may be moved transversely through the fluid flow passing from the internal cavity inlet to the outlet. The frusto-conical portion of the gate is adapted to seat against the frusto-conical shaped internal cavity to block fluid flow there through. The gate does not contact the seat until the point at which all fluid flow is shut off. This reduces wear on the gate and the seat and promotes laminar flow through the valve during the process of closing the valve.

31 Claims, 4 Drawing Sheets

CLOSED

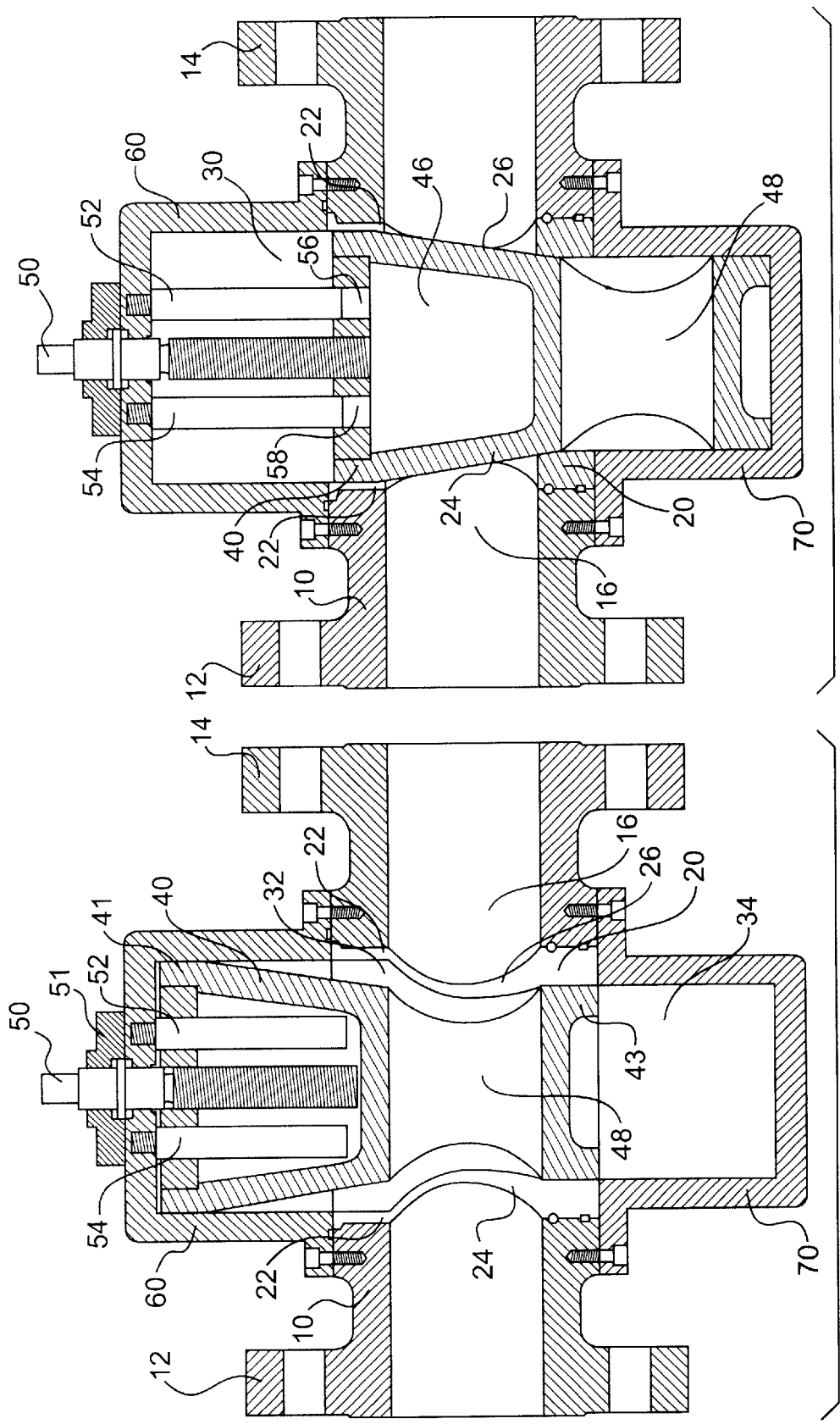
FIG. 2 OPEN
FIG. 3 CLOSED

METHOD AND VALVE FOR CONTROLLING FLUID FLOW, AND METHOD OF SERVICING VALVE

FIELD OF THE INVENTION

The present invention relates to gate valves for controlling fluid flow through a longitudinal passage. The present invention further relates to methods of controlling fluid flow through a longitudinal passage, and methods of servicing valves used to control fluid flow.

BACKGROUND OF THE INVENTION

The presently described gate valve may be used in particular to shut off high pressure flows. One of the problems commonly associated with gate valves, and particularly with high pressure shut-off gate valves, is that the seals used therein are undesirably subjected to high-pressure wear as the valve gate is slid between an opened and closed position. As the valve gate slides shut, the seal associated therewith may be subject to a high-pressure jet of fluid as the flow is pinched off by the valve.

A typical prior art valve mechanism is shown in FIG. 1 of Penick et al., U.S. Pat. No. 2,229,871. In Penick, the valve member 3 includes a side seal ring 17 that is in constant contact with the valve casing 1 as the valve member slides between opened and closed positions. As the gate (valve member 3) in Penick pinches off the last bit of fluid flow through the transverse opening 16, the seal 17 is directly in the path of a very high-pressure flow that may erode the seal material. As a result, the seal 17 may fail, or at the least, the valve may require frequent maintenance.

Valve maintenance is another problem commonly associated with high-pressure shut-off gate valves. In order to service a valve such as the one shown in Penick, the complete valve mechanism may need to be disconnected from the pipes that it connects. Removal of the entire valve can be a complicated and lengthy procedure, resulting in high maintenance costs and prolonged downtime of the fluid delivery system in which the valve is imbedded.

Still another problem associated with prior art valves, such as the one shown in Penick, is the disruption of laminar flow past the valve as it moves from an opened position to a closed position. With renewed reference to FIG. 1 of Penick, as the valve member 3 is slid downward, the flow through the transverse opening 16 is slowly cut off by the upper portion of the valve member. The fluid flow through the valve becomes turbulent because the flow experiences either complete blockage from the upper portion of the valve member 3, or an oddly shaped passage formed by the combination of the semi-blocked transverse opening 16 and the lower portion of the valve casing 1. This turbulent flow may be problematic for a variety of reasons, including its contribution to the erosion of the seals subjected to the turbulent flow.

Applicant has developed a gate valve, and methods of operating and servicing the gate valve, that alleviate, at least to some extent, the above-referenced problems of the prior art. Applicant's gate valves and methods involve the use of a valve with a frusto-conical gate and a mating seat which result in reduced seal wear, improved flow characteristics during transition of the gate, and improved valve serviceability. The tapered gate and seat provide for a unique type of seal having reduced drag on the seal when the valve is open. In accordance with Applicant's gate valves and methods, the sealing surface of the gate may travel freely right up until it contacts the frusto-conical seat. The gate sealing surface is only in contact with the seat surface after the valve is in the fully closed position. This feature may result in longer life for the sealing surfaces.

OBJECTS OF THE INVENTION

It is therefore an object of the present invention to provide a gate valve and method of operating a gate valve that subjects the sealing surfaces of the valve to less wear than some prior art valves.

It is another object of the present invention to provide a gate valve and a method of operating a gate valve that produces a less turbulent flow through the valve as it is moved between opened and closed positions.

It is a further object of the present invention to provide a gate valve that may be more easily serviced than some prior art valves.

It is yet another object of the present invention to provide a method of servicing a gate valve.

It is still yet another object of the present invention to provide a gate valve employing a frusto-conically shaped seat and a mating frusto-conically shaped gate.

Additional objects and advantages of the invention are set forth, in part, in the description which follows and, in part, will be apparent to one of ordinary skill in the art from the description and/or from the practice of the invention.

SUMMARY OF THE INVENTION

Responsive to the foregoing challenges, Applicant has developed an innovative valve for controlling fluid flow comprising: a housing having a longitudinal passage and a substantially orthogonally oriented bore intersecting the longitudinal passage; means for sealing the orthogonally oriented bore from an ambient surrounding the housing; a sleeve disposed in the orthogonally oriented bore; a frusto-conical cavity provided in the sleeve; first and second openings extending through the sleeve and aligned with the housing longitudinal passage; a gate contained by the means for sealing and at least partially disposed in the sleeve, said gate having a frusto-conical portion and a cylindrical portion; a linear passage extending through the gate cylindrical portion, said linear passage being adapted to align with the sleeve first and second openings; and means for sliding the gate relative to the sleeve so as to seat the frusto-conical portion of the gate against the frusto-conical cavity of the sleeve.

Applicant has further developed an innovative gate valve for controlling fluid flow through a housing, comprising: a housing with an internal bore and a flow passage intersecting and oriented transversely to the internal bore; a sleeve disposed in the internal bore, said sleeve having an internal frusto-conical seat and openings aligned with the housing flow passage; a gate adapted to be at least partially disposed in the sleeve, said gate having a frusto-conical portion; and means for moving the gate frusto-conical portion into the sleeve and transversely through the fluid flow until the frusto-conical portion of the gate contacts the internal frusto-conical seat of the sleeve.

Applicant has still further developed an innovative method of operating a gate valve comprising the steps of: providing a gate valve having a gate with a frusto-conical portion and a sleeve with a frusto-conical seat; providing fluid flow through the sleeve substantially orthogonal to the orientation of the frusto-conical seat; moving the frusto-conical portion of the gate transversely through the fluid flow; and maintaining the frusto-conical portion of the gate out of contact with the frusto-conical seat until a point that fluid flow through the sleeve is shut off.

Applicant has further developed for a gate valve having: a housing with an internal bore and a flow passage oriented transversely to the internal bore; a sleeve disposed in the internal bore, said sleeve having a frusto-conical seat; a gate at least partially disposed in the sleeve, said gate having a frusto-conical portion; and a cap for sealing the sleeve and gate within the housing, an innovative method of servicing the gate valve comprising the steps of: removing the cap from the housing; removing the gate from the housing; removing the sleeve from the housing; inserting a new sleeve into the housing; inserting the gate into the housing; and connecting the cap to the housing.

Applicant has further developed an innovative gate valve for controlling fluid flow through a housing, comprising: a housing with an internal frusto-conical seat and a flow passage intersecting and oriented transversely to the internal frusto-conical seat; a gate at least partially disposed in the housing, said gate having a frusto-conical portion; and means for moving the gate frusto-conical portion transversely through the fluid flow towards the housing frusto-conical seat until the frusto-conical portion of the gate contacts the housing frusto-conical seat.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

BRIEF DESCRIPTION OF THE DRAWINGS

In order to assist the understanding of this invention, reference will now be made to the appended drawings, in which like reference numerals refer to like elements. The drawings are exemplary only, and should not be construed as limiting the invention.

FIG. 2 is a side view in cross-section of the preferred embodiment of the invention in which the gate valve is shown in an open position.

FIG. 3 is a side view in cross-section of the preferred embodiment of the invention in which the gate valve is shown in a closed position.

DETAILED DESCRIPTION OF PREFERRED EMBODIMENTS OF THE INVENTION

Figure 1:
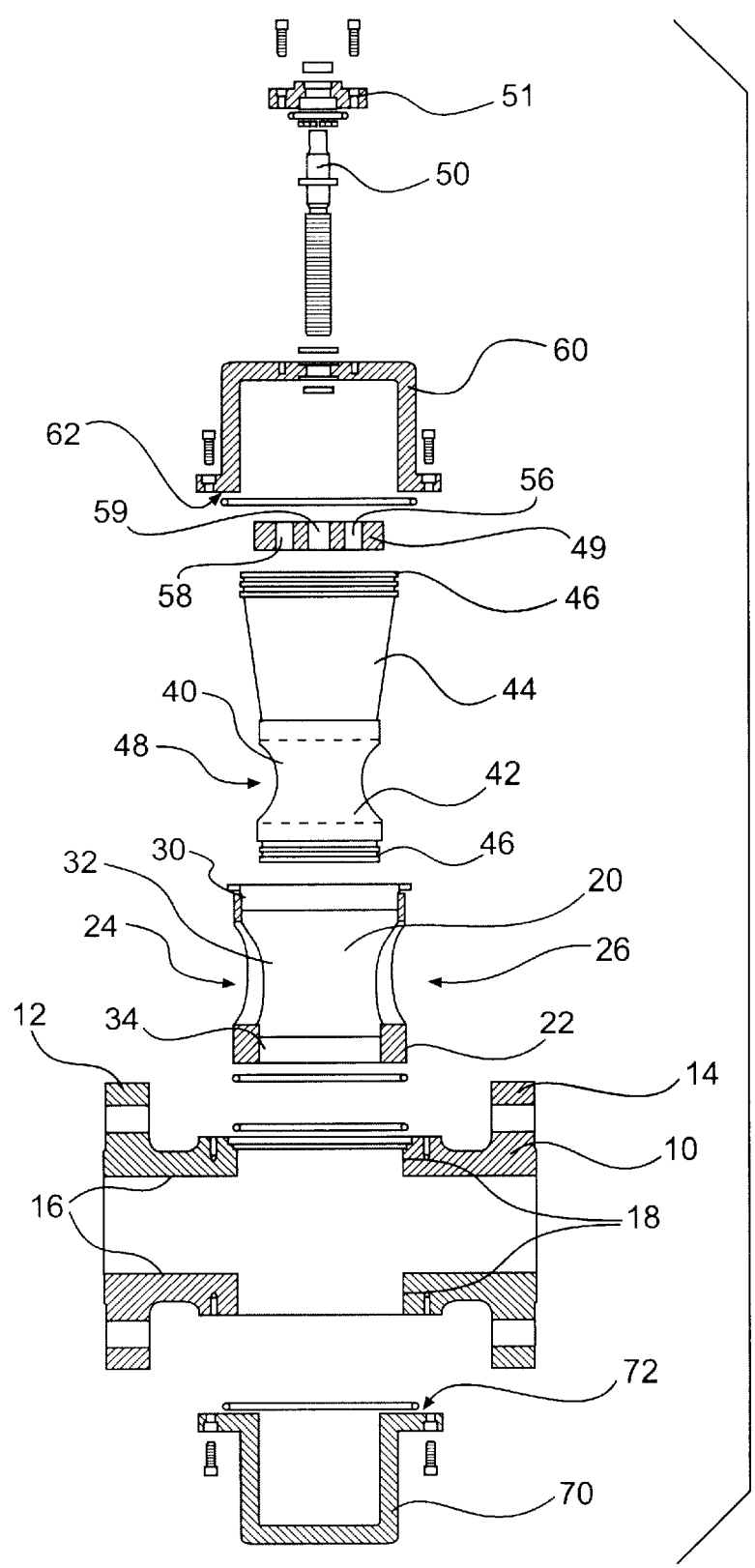
FIG. 1 is an exploded view in partial cross-section of a gate valve in accordance with a preferred embodiment of the invention.
Figure 5:
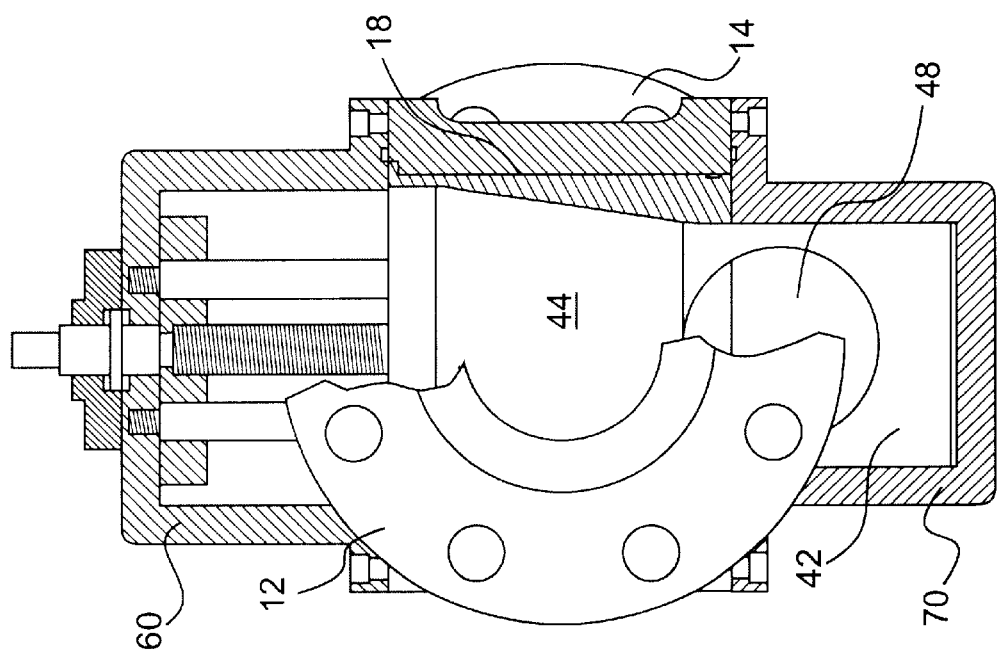
FIG. 5 is a flange end view in partial cut-away of the preferred embodiment of the invention in which the gate valve is shown in a closed position.
Figure 4:
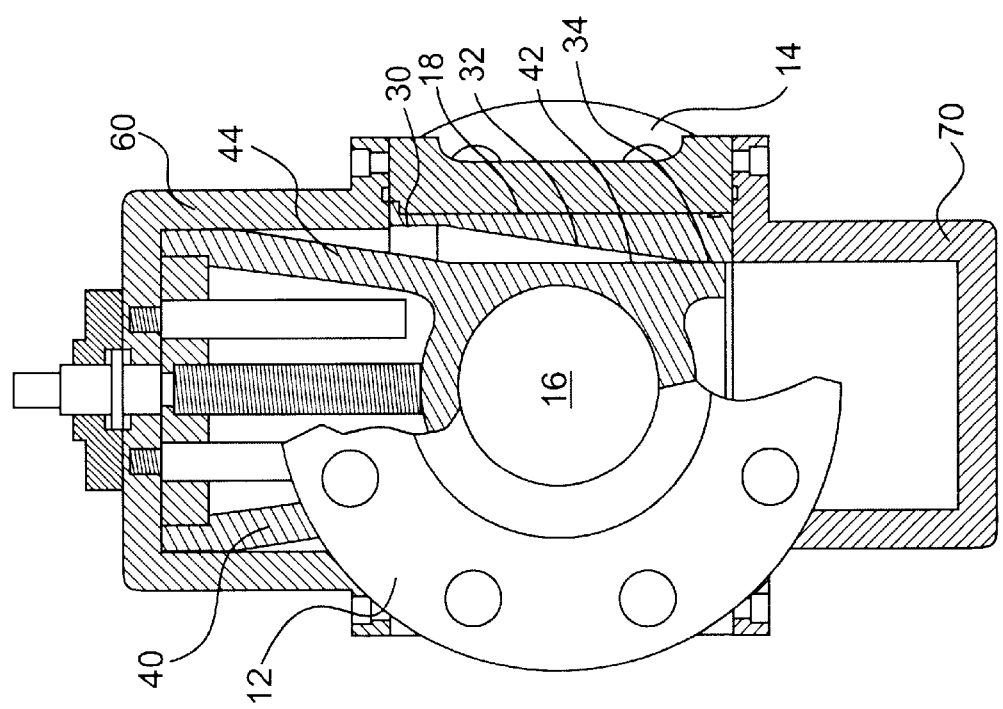
FIG. 4 is a flange end view in partial cut-away of the preferred embodiment of the invention in which the gate valve is shown in an open position.

Reference will now be made in detail to a preferred embodiment of the present invention, an example of which is illustrated in the accompanying drawings. With reference to FIG. 1, an exploded view is shown of a gate valve constructed in accordance with the present invention. The gate valve includes a housing 10, which may be constructed of a one-piece casting. The housing 10 may include a left flange 12 and a right flange 14 used to connect the housing to a fluid flow system. A longitudinal passage 16 extends through the housing 10 from one flange to the other. A central bore 18 extends through the housing from the top to the bottom thereof. The central bore 18 intersects the longitudinal passage 16, and may be substantially orthogonal thereto.

The central bore 18 is adapted to receive a cylindrically shaped sleeve 20 by sliding the sleeve into the central bore from the top of the housing 10. The sleeve 20 may include an annular groove 22 adapted to receive an O-ring seal used to seal the sleeve to the housing 10.

The inner wall of the sleeve 20 defines a central cavity. The central cavity may be divided into three distinct sections: a small diameter cylindrical section 34, a large diameter cylindrical section 30, and a frusto-conical section 32 extending from the small diameter section 34 to the large diameter section 30. First and second openings, 24 and 26, extend through the frusto-conical section 32 of the sleeve. When viewed end on, each of the sleeve openings 24 and 26 may have substantially the same size and shape (preferably circular) as the longitudinal passage 16 extending through the housing 10. The portions of the frusto-conical section 32 that have not been removed to form the sleeve openings 24 and 26 provide a valve seat.

The sleeve 20 is adapted to receive a gate 40 within its central cavity. The gate 40 includes a lower cylindrical portion 42 and an upper frusto-conical portion 44. A gate passage 48 extends through the cylindrical portion 42 of the gate. When viewed end on, the gate passage 48 has substantially the same size and shape as the longitudinal passage 16 in the housing 10 and the sleeve openings 24 and 26.

The gate 40 may include one or more annular recesses 46 adapted to receive O-ring seals to seal the upper and lower ends of the gate. A gate end cap 49 may be disposed within and connected to the upper end of the gate 40. The gate end cap 49 may include a central threaded opening 59, and one or more guide openings, 56 and 58. The central threaded opening 59 may be adapted to receive a drive screw actuator 50. The guide openings 56 and 58 may be adapted to receive alignment shafts 52 and 54 (shown in FIG. 2).

An upper cap 60 and a lower cap 70 may be bolted to respective upper and lower portions of the housing 10. The upper and lower caps 60 and 70, collectively seal off the inner workings of the gate valve from the ambient atmosphere surrounding the housing 10. A thrust bearing assembly 51 may be used to connect the drive screw 50 to the upper cap 60. Annular grooves 62 and 72 may be provided in the upper and lower caps 60 and 70, respectively, to accommodate O-ring seals to seal the caps to the housing 10. In addition to, or in place of O-rings, core type packing may be used to seal the upper and lower caps 60 and 70 to the housing 10. This type of packing is available in many materials to adapt to various temperature and pressure requirements.

With reference to FIG. 2, the gate valve is shown assembled in an open position. The upper cap 60 and the lower cap 70 are bolted and sealed to the housing 10. The sleeve 20 is disposed/sealed in the central bore 18 of the housing 10. The sleeve openings 24 and 26 are aligned with the longitudinal passage 16 extending through the housing 10.

In the fully open position, the gate 40 is retracted to its upper most position by the drive screw 50. The gate 40 is positioned such that the frusto-conical portion 44 of the gate is disposed in the upper cap 60. The alignment shafts 52 and 54, and the threaded portion of the drive screw 50 are disposed within the hollow interior of the frusto-conical portion 44 of the gate. The gate passage 48 extending through the cylindrical portion 42 of the gate is aligned with the sleeve openings 24 and 26 and the longitudinal passage 16. Alignment of the gate passage 48, the sleeve openings 24 and 26, and the longitudinal passage 16 provides a uniform diameter passage that encourages laminar flow through the gate valve.

The gate valve may be transitioned to the closed position shown in FIG. 3 by actuating the drive screw 50 with an external power source (not shown). A flange on the drive screw 50 rides between two roller thrust bearings in assembly 51 that are positioned in a space between a seal housing and the upper cap 60. The threads of the drive screw 50 engage mating threads on the gate end cap 49, which in turn is connected to the gate 40. Rotation of the drive screw 50 causes the gate 40 to translate downward. Vertical translation of the gate 40 is guided by sliding contact between the upper cylindrical portion 41 of the gate and the interior wall of the upper cap 60, by sliding contact between the lower cylindrical portion 43 of the gate and the interior wall of the lower cap 70, as well as by sliding contact between the guide shafts (52 and 54) and mating guide openings (56 and 58) provided in the gate end cap 49.

As the gate 40 transitions from the open position to the closed position, the linear passage 48 extending through the gate cylindrical portion 42 misaligns with the sleeve openings 24 and 26. Fluid flow though the linear passage 48 decreases as the gate 40 is lowered. Some fluid flow is diverted around the curved surface of the frusto-conical portion 44 of the gate. As shown in FIG. 3, the gate 40 reaches the end of its travel when the frusto-conical portion 44 of the gate seats against the frusto-conical section 32 of the sleeve 20, thereby stopping flow through the gate valve.

The frusto-conical portion 44 of the gate is adapted to mate with and seat against the frusto-conical section 32 of the sleeve when the gate 40 is slid down into the central cavity of the sleeve 20. Preferably the frusto-conical portion 44 of the gate and the frusto-conical section 32 of the sleeve taper inward between 12 and 20 degrees from vertical. If the inward taper is too small (less than about 2 inches per foot or about 9.5 degrees) the torque required to move the gate 40 from a closed position to an open position may become excessive due-to the binding of the gate to the sleeve 20.

In transition from a closed to an open position, the drive screw 50 may be rotated in the opposite direction to retract the frusto-conical portion 44 of the gate 40 into the upper cap 60. As the gate 40 translates upward, the linear passage 48 aligns with the sleeve openings 24 and 26, reestablishing flow through the gate valve.

Throughout the transition (either opening or closing) of the gate 40, the fluid flow force is perpendicular to direction of movement of the gate, which may reduce the amount of force required to close the valve. This may also create less wear on the drive screw and threaded area of the gate 40.

The wear elements-of the described gate valve (e.g., gate, sleeve, drive screw, etc.) may be replaced without the valve housing 10 being removed from its installation. The above mentioned components can be supplied as a "set" to the user. First, the upper and/or lower caps 60 and 70 may be removed. The worn gate and sleeve may be removed and replaced with new components. The seal housing and the seal retainer may be removed from the upper cap 60. The seals in the thrust bearing assembly 51 and/or the drive screw 50 may be replaced with new components and reassembled in reverse order. This allows the valve to be rebuilt to new specifications while leaving the plumbing intact. This also eliminates the costly and time-consuming replacement or reworking of the housing.

Figure 6:
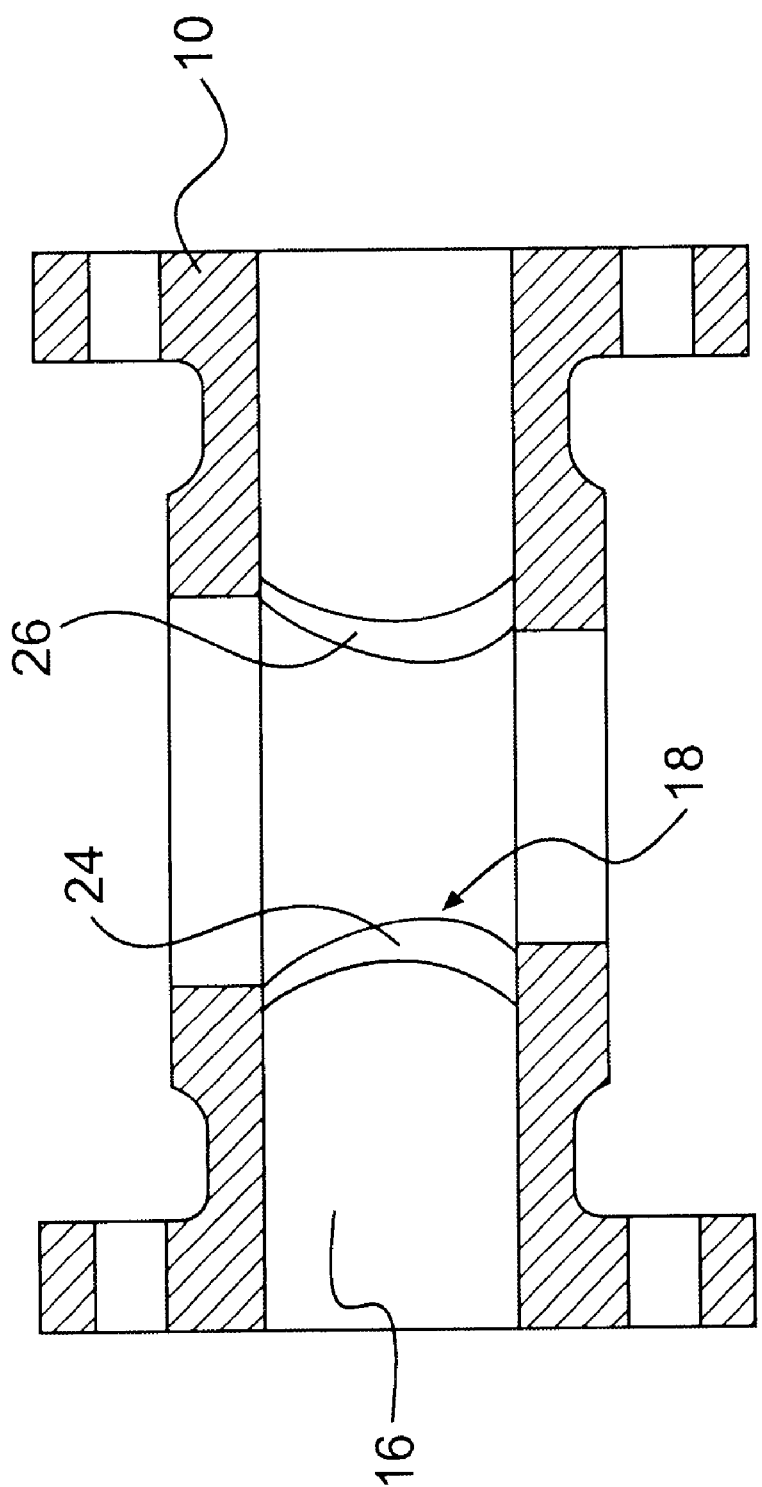
FIG. 6 is a side view in cross-section of an alternative embodiment of the invention in which the sleeve features are integrally incorporated into the housing.

With reference to FIG. 6, in an alternative embodiment of the invention the sleeve 20 may be eliminated, and the features of the sleeve incorporated into the housing 10. In such an embodiment, the frusto-conical cavity or seat would be defined by the wall of the bore 18 in the housing.

The embodiments of the present valve may be manufactured from various materials to adapt to different mechanical, chemical, and corrosion resistance requirements. These materials include, but are not limited to, ferrous and non-ferrous metals, alloys (such as stainless steel), fiber composites, and high strength plastics. In a preferred embodiment of the invention, the wear components, such as the gate and the sleeve, may be comprised of an aluminum-bronze alloy.

A particular advantage of the present invention is that it is not directionally related to flow. In other words, there is no given pressure side, so the inlet and outlet ends of the valve may be reversed without affecting valve performance.

It will be apparent to those skilled in the art that variations and modifications of the present invention can be made without departing from the scope or spirit of the invention. For example, the materials used to construct each of the elements of the gate valve may vary without departing from the scope of invention so long as the elements provide the described functions. Furthermore, the shape and size of the elements and the passages extending there through may vary without departing from the intended scope of the invention. Still further, the scope of the invention may extend to variations in the means for actuating the gate valve, which may include any type of linear actuator whether it be a screw drive, a hydraulic piston, solenoid, mechanical, or other type of actuator. Still further yet, it is appreciated that the described gate valves and methods may be used in connection with any of a wide variety of fluids, whether they be high or low pressure, corrosive or non-corrosive, high or low temperature, or otherwise characterized. Thus, it is intended that the present invention cover all such modifications and variations of the invention, provided they come within the scope of the appended claims and their equivalents.

What is claimed is:

1. A valve for controlling fluid flow comprising:
   a housing having a longitudinal passage and a substantially orthogonally oriented bore intersecting the longitudinal passage;
   means for sealing the orthogonally oriented bore from an ambient surrounding the housing;
   a sleeve disposed in the orthogonally oriented bore;
   a frusto-conical cavity provided in the sleeve;
   first and second openings extending through the sleeve and aligned with the housing longitudinal passage;
   a gate contained by the means for sealing and at least partially disposed in the sleeve, said gate having a frusto-conical portion and a cylindrical portion;
   a linear passage extending through the gate cylindrical portion, said linear passage being adapted to align with the sleeve first and second openings; and
   means for sliding the gate relative to the sleeve so as to seat the frusto-conical portion of the gate against the frusto-conical cavity of the sleeve.

2. The valve of claim 1 wherein the orthogonally oriented bore is a cylindrical bore.

3. The valve of claim 1 wherein the means for sliding the gate comprises a drive screw.

4. The valve of claim 1 wherein the means for sliding the gate comprises an actuator selected from the group consisting of: a hydraulic actuator, a non-screw mechanical actuator, and a solenoid actuator.

5. The valve of claim 1 further comprising:
  at least one ring seal between the sleeve and the housing; and
  at least one ring seal between the means for sealing and the housing.

6. The valve of claim 1 wherein the frusto-conical portion of the gate has a taper of between approximately 12 to 20 degrees.

7. The valve of claim 1 wherein the sleeve further comprises:
  a first diameter cylindrical section adjacent to a first end of the frusto-conical cavity; and
  a second diameter cylindrical section adjacent to a second end of the frusto-conical cavity.

8. The valve of claim 1 further comprising at least one ring seal provided annularly around an end of the gate.

9. The valve of claim 1 further comprising at least one ring seal provided annularly around each end of the gate.

10. The valve of claim 1 wherein the frusto-conical portion of the gate has a taper of no less than two inches per foot.

11. The valve of claim 1 wherein the means for sealing comprises an upper cap and a lower cap connected to the housing.

12. The valve of claim 11 further comprising at least one guide shaft extending downward from the upper cap into the frusto-conical portion of the gate.

13. The valve of claim 11 wherein the upper cap provides a guide for an upper end of the gate, and the lower cap provides a guide for a lower end of the gate.

14. A gate valve for controlling fluid flow through a housing, comprising:
  a housing with an internal bore and a flow passage intersecting and oriented transversely to the internal bore;
  a sleeve disposed in the internal bore, said sleeve having an internal frusto-conical seat and openings aligned with the housing flow passage;
  a gate adapted to be at least partially disposed in the sleeve, said gate having a frusto-conical portion and a guide portion at a lower end of the gate; and
  means for moving the gate frusto-conical portion transversely through the fluid flow into the sleeve until the frusto-conical portion of the gate contacts the internal frusto-conical seat of the sleeve.

15. The valve of claim 14 wherein the means for moving the gate comprises an actuator selected from the group consisting of: a screw drive, a hydraulic actuator, a non-screw mechanical actuator, and a solenoid actuator.

16. The valve of claim 14 wherein the frusto-conical portion of the gate has a taper of between approximately 12 to 20 degrees.

17. The valve of claim 14 wherein the frusto-conical portion of the gate has a taper of no less than two inches per foot.

18. The valve of claim 14 further comprising an upper cap and a lower cap connected to the housing to seal the gate within the housing.

19. The valve of claim 18 further comprising:
  at least one ring seal between the sleeve and the housing; and
  at least one ring seal between the upper cap and the housing.

20. The valve of claim 18 wherein the upper cap provides a guide for an upper end of the gate, and the lower cap provides a guide for a lower end of the gate.

21. The gate valve of claim 14 wherein the gate lower end further comprises a means for guiding fluid flow through the valve.

22. The gate valve of claim 21 wherein the means for guiding fluid flow comprises a fluid passage extending through the gate lower end.

23. The gate valve of claim 21 wherein the means for guiding fluid flow comprises a fluid passage extending through the gate lower end.

24. A gate valve for controlling fluid flow through a housing, comprising:
  a housing with an internal frusto-conical seat and a flow passage intersecting and oriented transversely to the internal frusto-conical seat;
  a gate at least partially disposed in the housing, said gate having a frusto-conical portion and a guide portion at a lower end of the gate; and
  means for moving the gate frusto-conical portion transversely through the fluid flow towards the housing frusto-conical seat until the frusto-conical portion of the gate contacts the housing frusto-conical seat.

25. The valve of claim 24 wherein the means for moving the gate comprises an actuator selected from the group consisting of: a screw drive, a hydraulic actuator, a non-screw mechanical actuator, and a solenoid actuator.

26. The valve of claim 24 wherein the frusto-conical portion of the gate has a taper of between approximately 12 to 20 degrees.

27. The valve of claim 24 wherein the frusto-conical portion of the gate has a taper of no less than two inches per foot.

28. The gate valve of claim 24 wherein the gate lower end further comprises a means for guiding fluid flow through the valve.

29. The valve of claim 24 further comprising an upper cap and a lower cap connected to the housing to seal the gate within the housing.

30. The valve of claim 29 wherein the upper cap provides a guide for an upper end of the gate, and the lower cap provides a guide for a lower end of the gate.

31. A method of operating a gate valve comprising the steps of:
  providing a gate valve having (i) a gate with a frusto-conical portion and a guide portion at a lower end of the gate, and (ii) a sleeve with a frusto-conical seat;
  providing fluid flow through the sleeve substantially orthogonal to the orientation of the frusto-conical seat;
  moving the frusto-conical portion of the gate transversely through the fluid flow; and
  maintaining the frusto-conical portion of the gate out of contact with the frusto-conical seat until a point that fluid flow through the sleeve is shut off.

* * * * *